Nov. 16, 1965 T. T. HOUSTON 3,218,127
PROCESS OF PRODUCING HYDROGEN FLUORIDE IN A TWO-STAGE
PROCEDURE AND EFFECTING A RAPID EVOLUTION OF THE
HYDROGEN FLUORIDE BY SWEEPING THE SECOND STAGE
WITH AN INERT GAS
Filed Sept. 10, 1962
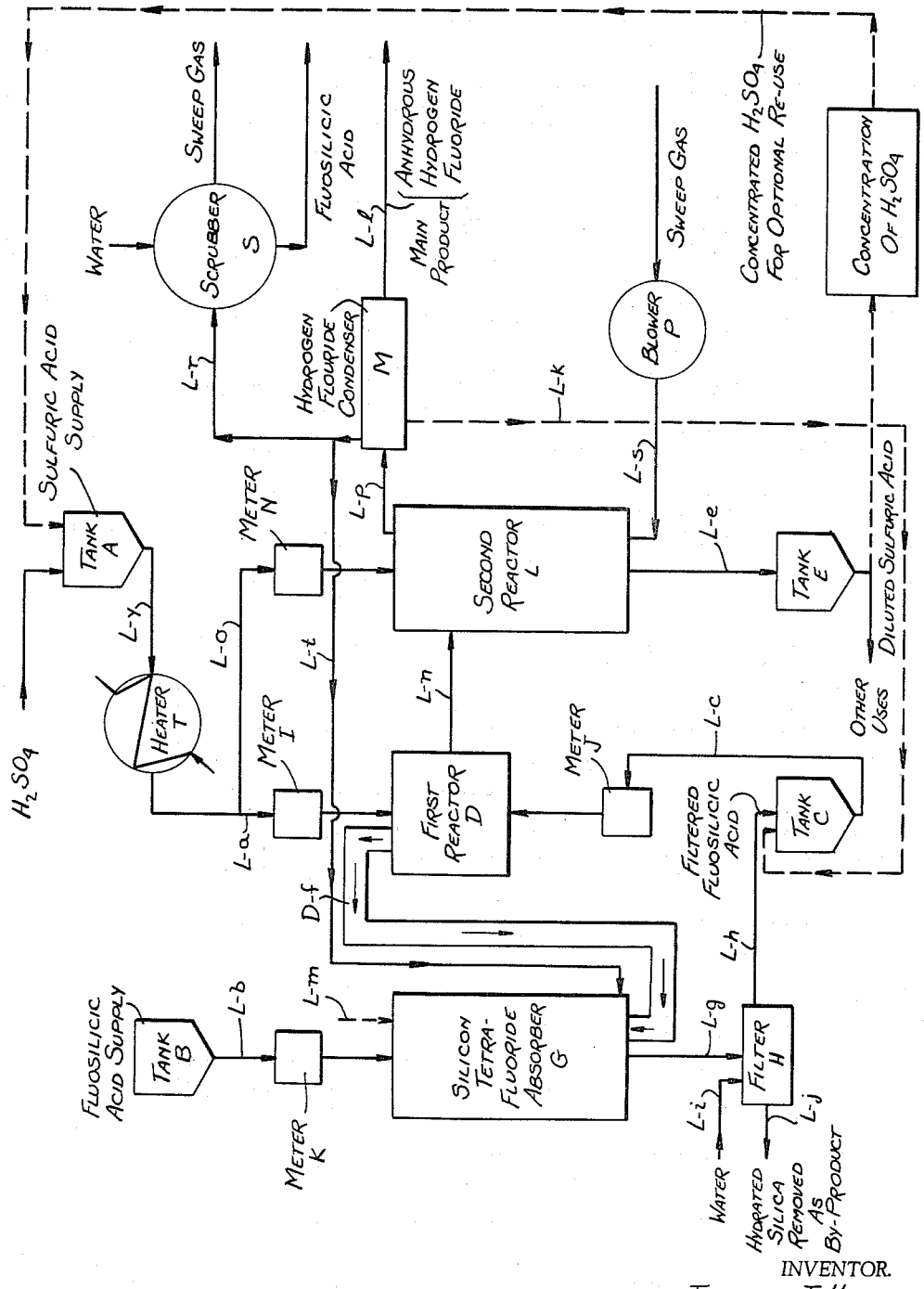
INVENTOR.
THEODORE T. HOUSTON 3,218,127
PROCESS OF PRODUCING HYDROGEN FLUORIDE IN A TWO-STAGE PROCEDURE AND EFFECTING A RAPID EVOLUTION OF THE HYDROGEN FLUORIDE BY SWEEPING THE SECOND STAGE WITH AN INERT GAS
Theodore T. Houston, Tampa, Fla., assignor, by mesne assignments, to Tennessee Corporation, New York, N.Y., a corporation of Delaware
Filed Sept. 10, 1962, Ser. No. 222,443
6 Claims. (Cl. 23—153)

The present application is related to copending applications of Llewellyn C. Oakley, Jr., and Theodore T. Houston (Serial No. 222,526), of Theodore T. Houston and Gerald E. G. Wilkinson (Serial No. 222,527), of Gerald E. G. Wilkinson (Serial No. 222,447), and of Fred J. Klem (Serial No. 222,424), all of which have been assigned to a common assignee.

The present invention relates to an improved process of producing hydrogen fluoride in a two-stage procedure and effecting a rapid evolution of the hydrogen fluoride by sweeping the second stage with an inert gas.

It is an object of the present invention to provide an improved process of producing hydrogen fluoride involving a two-stage procedure to effect the rapid evolution of hydrogen fluoride by sweeping the second stage with an inert gas.

Another object of the invention is to provide an improved process of producing hydrogen fluoride involving the dehydration and decomposition of clear fluosilicic acid with strong sulfuric acid under conditions of concentration of sulfuric acid, temperature and retention time so that substantially all of the silicon tetrafluoride is evolved in the first stage as a substantially dry gas and is reabsorbed in water to produce more fluosilicic acid while the hydrogen fluoride is retained in a weaker sulfuric acid solution and is effectively liberated in the second stage in an efficient manner by sweeping inert gas through the second reactor.

It is a further object of the invention to provide an improved process of producing hydrogen fluoride involving a two-stage procedure to retain substantially all of the hydrogen fluoride produced in the first stage in less concentrated sulfuric acid and to liberate substantially all of the hydrogen fluoride in the second stage by sweeping the second reactor with an inert gas.

The invention further contemplates providing an improved process of producing hydrogen fluoride in a two-stage procedure with practical equipment and operations on an industrial scale and incorporating provisions for sweeping the second reactor with an inert gas.

Other objects and advantages will become apparent from the following description taken in conjunction with the accompanying drawing which is a flow sheet illustrating the operations and equipment diagrammatically to carry the improved process into practice with two-stage procedure and with the provisions for sweeping the second reactor with an inert gas.

Broadly stated, the present invention contemplates an improved process in which clear fluosilicic acid is treated in a first reactor with definite control of concentration of the sulfuric acid, temperature, and retention time so that essentially all the silicon tetrafluoride is evolved as a gas while most of the hydrogen fluoride remains in the acid solution leaving the first reactor. When fluosilicic acid and sulfuric acid are mixed and the hydrogen fluoride and silicon tetrafluoride released as substantially dry gases, it has been found that the release of the hydrogen fluoride is much less rapid than is the release of the silicon tetrafluoride. In other words, the gases are released at two different rates.

Under conditions of retention time and temperature at which a series of tests were performed (e.g. about two minutes at about 120° C. (248° F.)), essentially none of the hydrogen fluoride and above about ninety-six percent of the silicon tetrafluoride were liberated when the specific gravity of the residual solution was about 55.5° Bé. (corresponding to about 70.4% $H_2SO_4$). Under the same conditions when the terminal specific gravity of the acid solution was about 58.5° Bé. (corresponding to about 73.2% $H_2SO_4$), an excess of 20% of the hydrogen fluoride was liberated with the residual silicon tetrafluoride being about 2.5%. It is thus apparent that a slight change in the terminal sulfuric acid concentration (in the above case from about 70% to about 75% $H_2SO_4$) results in a substantial change in the quantity of hydrogen fluoride liberated in a given time, yet only a minor change in the quantity of silicon tetrafluoride remaining. As is obvious to one skilled in the art, the concentrations apply only to the retention time and temperature specified. With a longer retention time at the same temperature, the same results would be effected at a lower sulfuric acid concentration, or with a shorter retention time at a higher concentration; similarly with the same retention and a higher temperature, a lower sulfuric acid concentration would effect the same results. For each temperature and retention time, there will be a concentration of sulfuric acid which will result in essentially or substantially all of the silicon tetrafluoride liberated and essentially or substantially all of the hydrogen fluoride retained.

Practical considerations, however, somewhat limit the range of concentrations to be used. At lower concentrations, say below about 50° Bé., either temperatures must be higher causing unnecessary corrosion problems with the equipment or retention time must be long causing larger and more expensive equipment. At higher concentrations above, say about 63° Bé., either the retention time must be kept so low that control becomes a problem or temperature must be so low that it becomes necessary to heat the highly corrosive sulfuric acid stream containing the dissolved hydrogen fluoride, in order to have a sufficiently high temperature in the second reactor.

The range of about 55° Bé. to about 60° Bé. was found to be the most satisfactory. Silicon tetrafluoride gas is absorbed by water or by the water contained in the supply of fluosilicic acid to build up a stronger fluosilicic acid and produce a precipitate of hydrated silica. While any suitable strength sulfuric acid and/or clear fluosilicic acid can be used, provided they can be mixed in such proportions to yield the desired concentrations in the first and second reactors, ceratin practical considerations limit the concentrations when the process is carried into practice. In the case where the sulfuric acid is to be concentrated for re-use in the process, a minimum quantity should be used to keep down concentration cost. On the other hand, where the sulfuric acid used in the process is to be used in the production of superphosphate or wet process phosphoric acid, the quantity used must not exceed the quantity consumed in the acidulation of phosphate rock to produce the quantity of fluosilicic acid to be treated. For example, when one ton of normal superphosphate is produced, approximately 0.36 ton of 100% sulfuric acid are required and from about 15 to 25 pounds of fluosilicic acid (100% basis) are recovered. The strength of the fluosilicic acid leaving the absorption tower would have to be sufficiently concentrated so that all of it could be reacted with the available sulfuric acid.

Hydrated silica is filtered off as a precipitate which is washed with water. The clear or filtered fluosilicic acid thus-produced is sent back to the first reactor. Hot sulfuric acid containing most of the hydrogen fluoride goes immediately to the second reactor where more concentrated sulfuric acid is added which brings up the temperature and the concentration. Hydrogen fluoride is released from the sulfuric acid and is condensed in a hydrogen fluoride condenser. The necessary controls and conditions in the second reactor are set forth as follows:

Four inter-related variable factors determine the conditions in the second reactor. They are:
(1) The temperature of the sulfuric acid solution of hydrogen fluoride.
(2) The terminal concentration of the sulfuric acid solution.
(3) The retention time.
(4) The quantity of inert sweep gas used.

The temperature has as its upper limit the boiling point of the particular strength of sulfuric acid utilized. While there is no theoretical lower limit, however, practical considerations fix the lower limit in the range around about 90° C. (194° F.). At temperatures much below about 90° C. (194° F.) the release of hydrogen fluoride becomes slow requiring excessive retention time and large equipment for substantially complete release of the hydrogen fluoride.

The terminal sulfuric concentration has an upper limit of about 100% $H_2SO_4$ and theoretically has no well defined lower limit. Practically speaking, however, below a concentration of about 65% $H_2SO_4$ release of hydrogen fluoride is excessively slow.

As is well known to one skilled in the art, retention time is a function of other conditions imposed upon the reaction. Under conditions of high temperature, sulfuric acid concentration and large volume of sweep gas, retention time in the order of about one minute or so is sufficient for substantially complete release of the hydrogen fluoride. On the other hand, without sweep gas and at low temperatures and sulfuric acid concentration, several hours are required.

The larger the ratio of the volume of inert sweep gas to dissolved hydrogen fluoride (HF), the more rapid is the release of HF. However, as the volume increases, the difficulties in condensing hydrogen fluoride from the sweep gas increase. In general, the proportions of sweep gas to HF varying from about one half to about two pound moles of inert gas per pound of HF in solution are satisfactory.

The following illustrative examples will enable one skilled in the art to select appropriate combinations of the foregoing factors to provide conditions to give the best or preferred results for any given situation.

The use of the inert sweep gas greatly reduces the necessary retention time to accomplish the same hydrogen fluoride removal at any given temperature or reduces the temperature required at a fixed retention time.

In carrying the invention into practice, it is preferred to use the operations and the equipment illustrated in the accompanying drawing.

A supply of concentrated sulfuric acid, such as commerically available of about 66° Bé acid as produced by the conventional contact process, is provided by tank A and a supply of clear or filtered aqueous fluosilicic acid is provided by tank C. The sulfuric acid flows from tank A through line L–y to heater T which heats it to a selected and controlled temperature. After heating, the hot acid flows through line L–a to meter I which controls the proper amount going to reactor D. Materials of construction to this point can be those conventionally used in the art to handle the strength of sulfuric acid employed as those skilled in the art understand. The clear or filtered fluosilicic acid is also fed to reactor D and flows from tank C through line L–c and meter J which are plastic or rubber lined and which control the amount.

In the first reactor D, such as a graphite or fluorocarbon lined vessel, aqueous fluosilicic acid is dehydrated by concentrated sulfuric acid. The retention time, temperature, and terminal concentration of the liquid leaving the reactor are controlled so that substantially all of the silicon tetrafluoride and a small portion of the hydrogen fluoride are liberated as gases while most of the hydrogen fluoride remains in the sulfuric acid. Silicon tetrafluoride gases leave reactor D via duct D–f to a plastic or rubber lined silicon tetrafluoride absorber G.

Fresh aqueous fluosilicic acid flows from tank B through meter K via line L–b to absorber G. To prevent small losses or minimize the escapage of fumes to the atmosphere, additional water may be optionally added to absorber G via line L–m. In the absorber, silicon tetrafluoride reacts with water to form fluosilicic acid and a precipitate of silica. The slurry of silica and fluosilicic acid flows via line L–g to rubber covered filter H where the silica precipitate is removed and is washed with water supplied by line L–i. The clear or filtered fluosilicic acid flows via line L–n and is recycled in the process to plastic or rubber lined tank C. The silica precipitate is removed via conveyor L–j for other uses or further processing.

The sulfuric acid stream flows from the first reactor D via line L–h to graphite or fluorocarbon lined second reactor L. Additional hot concentrated sulfuric acid is added by line L–o through meter N from sulfuric acid supply tank A. In second reactor L, hydrogen fluoride gas is stripped from the solution of sulfuric acid. The sulfuric acid, which is now diluted with the water in the fluosilicic acid and which forms a solution, leaves through line L–e to tank E. From tank E, it can be concentrated for re-use in this process or it can be utilized in other processes. The substantially dry hydrogen fluoride gas leaves second reactor L via line L–p to a hydrogen fluoride condenser M.

It was discovered that the hydrogen fluoride gas could be removed efficiently by sweeping the second reactor with an inert gas. It was found in practice that air could be satisfactorily used. Other inert gases capable of being used to sweep hydrogen fluoride from the sulfuric acid solution include but are not limited to the following:

(A) Components of the air, such as oxygen, nitrogen, argon, neon, helium, krypton, etc.
(B) Oxides of carbon—carbon dioxide and carbon monoxide.
(C) Hydrogen.
(D) Appropriate mixtures of certain of the foregoing gases.

It is essential that the gas should not react with hydrogen fluoride or sulfuric acid or any of the ingredients of the solution and should not polymerize, etc., under the conditions of the operation.

When the sulfuric acid solution in the second reactor is at a temperature of about 200° F. (93° C.) and contains about 0.03 grams of hydrogen fluoride/per cubic centimeter of acid solution or about 0.25 pounds of hydrogen fluoride per gallon of acid solution, about 40 cubic feet of air per gallon of solution are swept or blown through the second reactor.

It has also been found that the smaller the bubble of air or inert gas, the more efficient it is to sweep hydrogen fluoride from the second reactor. For instance, the air can be introduced via means for controlling the size of the air bubbles or the size of the stream. In the event that very small bubbles are required, porous units or the like may be used. Generally speaking, the more air or inert gas blown through the second reactor, the larger the percentage of hydrogen fluoride removed or swept from the acid solution under the same conditions of retention time and temperature. As a general rule, about 25 to about 100 cubic feet of air per gallon of acid solution at a temperature of about 200° F. (93° C.) will remove about 80% to about 99% of the hydrogen fluoride.

Referring to the drawing, it will be observed that the inert gas is introduced into the second reactor L by blower P through line L–s. After condensation of hydrogen fluoride in condenser M, the inert gas may optionally be returned to absorber G via line L–t or diverted via line L–r and separately scrubbed in scrubber S. The fluosilicic acid therein produced may be utilized in the process or discarded.

Anhydrous hydrogen fluoride leaves the condenser via line L–l to storage or utilization. When operating conditions are selected, a small quantity of aqueous hydrogen fluoride normally will be condensed in the inlet portion of the condenser due to the slight carry-over of water. The solution coming from the hydrogen fluoride condenser M may be recycled via line L–k to the aqueous fluosilicic acid supply tank C. The sulfuric acid, now diluted with water in the fluosilicic acid, leaves the second reactor L through line L–e to tank E. From this point, it can be concentrated for re-use in this process or utilized in other processes.

For the purpose of giving those skilled in the art a better understanding of the invention, the following illustrative example is given:

For carrying this example into practice, an agitated vessel was used for the first reactor. Conditions of the test were carefully controlled. Thus, the temperature was controlled at about 125° C. (257° F.), the retention time at about 4 minutes, and the surface-to-volume ratio at about 0.10. The Baumé of the liquid acid leaving the first reactor was about 55° Bé. at 15.6° C. (60° F.) which is an indication of the terminal concentration of the acid.

A carbon tower packed with coke was used in this test as the second reactor. The down-flow rate was increased to about 38 gallons per hour per square foot thereby reducing the retention time to about one to about three minutes. Sufficient 98.5% sulfuric acid was added to maintain the Baumé of the liquid leaving the second reactor to about 60° Bé. (77.67% $H_2SO_4$) at 15.6° C. (60° F.).

Air was used as the inert gas and was introduced at the bottom of the column in the carbon tower at a rate equivalent to about 20 pounds of air per pound of hydrogen fluoride contained in the acid. The heat losses were quite high and the temperature of the acid in the second reactor averaged only about 95° C. (203° F.).

About 2906 pounds of sulfuric acid (98.5% $H_2SO_4$) were conducted from supply tank A via line L–y to and through heater through heater T. From heater T the acid flowed via line L–a to and through meter I and into the first reactor D. Simultaneously with the flow of sulfuric acid, about 1605 pounds of clear or filtered fluosilicic acid (25% $H_2SiF_6$) together with about 5 pounds of hydrogen fluoride flowed from storage tank C via line L–c to and through meter J and into the first reactor D.

After about 4 minutes retention time with the acid solution in the first reactor controlled at about 125° C. (257° F.) and surface-to-volume ratio at about 0.10, substantially all of the silicon tetrafluoride gas and some hydrogen fluoride gas evolved in the first reactor was exited via duct D–f from the first reactor D into silicon tetrafluoride absorber G. In this test, about 289 pounds of silicon tetrafluoride and about 10 pounds of hydrogen fluoride were so evolved. These gases were absorbed in absorber G with about 632 pounds of 20% fluosilicic acid ($H_2SiF_6$) which flowed from fluosilicic acid supply tank B via line L–b to and through meter K and into absorber G. About 723 pounds of water were supplied to absorber G via line L–m to supplement the fluosilicic acid. The slurry of fluosilicic acid and precipitated silica was discharged from absorber G via line L–g to filter H. About 1603 pounds of fluosilicic acid (25.3% $H_2SiF_6$) were recovered in the filtrate and about 50 pounds of silica as a precipitate in the filter cake. The silica precipitate was washed on the filter H with about 50 pounds of water and was removed from the filter via line L–j to storage.

Associated with the removed silica were about 45 pounds of water and about 5 pounds of fluosilicic acid ($H_2SiF_6$). Leaving filter H via line L–h, the clear filtrate containing about 1603 pounds of fluosilicic acid (25% $H_2SiF_6$) was discharged into fluosilicic acid storage tank C. The hot liquid acid phase from the first reactor D containing about 4110 pounds of sulfuric acid (about 69.6% $H_2SO_4$), about 106.5 pounds of hydrogen fluoride and about 0.7 pounds $SiF_4$, was discharged from the first reactor D via line L–n into the second reatcor L.

About 1578 pounds of sulfuric acid (98.5% $H_2SO_4$) were flowed in the second reactor L from supply tank A via line L–y to and through heater T. From heater T, the acid flowed via lines L–a and L–o to and through meter N and then into the second reactor L. With a retention time of about one to about three minutes, an average temperature of about 95° C. (203° F.) and a down flow rate of about 38 gallons per hour per square foot, the second reatcor was swept with an inert gas. About 20 pounds of inert gas, in this case air, were used for each pound of hydrogen fluoride contained in the tower acid. The air was blown from blower P via line L–s and was introduced into the bottom of the second reactor tower L. As a result of sweeping with air, substantially all of the hydrogen fluoride (about 105 pounds) together with about 0.7 pound of silicon tetrafluoride ($SiF_4$), and about 1 pound of water was evolved from the tower liquid and was exited from the second reactor L via line L–p to the hydrogen fluoride condenser M. From hydrogen fluoride condenser M, about 100 pounds of anhydrous hydrogen fluoride went via line L–l to storage or utilization.

The inert sweep gas (air, etc.) amounting to about 2100 pounds flowed from the condenser M via line L–r to scrubber S. The dilute fluosilicic acid produced therein was discarded. However, if desired, it could have been used in the process as a clarified or filtered solution. The inert sweep gas, if desired, also could have been returned to absorber G via line L–t. Aqueous hydrofluoric acid (about 6 pounds) containing about 5 pounds of hydrogen fluoride and about 1 pound of water ($H_2O$) was discharged from condenser M via line L–k to the fluosilicic acid supply tank C. The substantially defluorinated sulfuric acid amounting to about 5687 pounds (about 77.6% $H_2SO_4$) and containing about 1.5 pounds of hydrogen fluoride was conducted form the second reactor L via line L–e to storage tank E.

The present invention is particularly applicable to situations such as the following:

In the manufacture of superphosphate, the phosphate rock normally employed contains from three to four percent fluorine. In the operation, 25 to 40% of the fluorine is evolved and must be scrubbed from the vapors leaving the den. When absorbed in water, a dilute fluosilicic acid results, which frequently presents a disposal problem. Sulfuric acid as produced by the contact process is more concentrated than is optimum for the production of superphosphate. The discovery herein disclosed affords a method of converting the otherwise undesirable waste fluosilicic acid into a valuable product, anhydrous hydrogen fluoride, at the same time converting the sulfuric acid to be used to a more desirable strength.

The same situation is true in the production of "wet process" phosphoric acid in which 20% to 50% of the fluorine values in the rock are liberated and must be recovered. From the tremendous tonnage of phosphatic fertilizers consumed each year, the great value of this discovery is apparent.

In still another section of the art, this discovery has great value. The resources of high grade fluospar used in the producion of hydrogen fluoride by conventional processes are somewhat limited. This process permits the utilization of low grade (high silica) fluospar ($CaF_2$). The fluospar is acidulated with the used acid from the process and the fluoride containing vapors absorbed in water to produce a mixture of hydrofluoric and fluosilicic acids. Said mixture can then be converted by this process to pure anhydrous hydrogen fluoride.

Although the present invention has been described in conjunction with preferred embodiments, it is to be understood that modification and variations may be resorted to without departing from the spirit and scope of the invention, as those skilled in the art will readily understand. Such modifications and variations are considered to be within the purview and scope of the invention and appended claims.

I claim:

1. In a process of producing hydrogen fluoride as a dry vapor from fluosilicic acid-containing solutions with a two-stage procedure, the improvement which comprises subjecting a fluosilicic acid-containing solution to the action of heated concentrated sulfuric acid in a closed reactor in a first stage under conditions of concentration of sulfuric acid, temperature and retention time so that substantially all of the silicon tetrafluoride is evolved in the first stage as a substantially dry vapor while most of the hydrogen fluoride is retained in the remaining diluted weaker sulfuric acid solution, withdrawing said vapor containing silicon tetrafluoride from said closed reactor in said first stage, removing said diluted weaker sulfuric acid solution containing hydrogen fluoride from said closed reactor in the first stage, conducting said removed solution to a closed reactor in a second stage, introducing into said closed reactor hot concentrated sulfuric acid of sufficiently high strength to maintain a terminal concentration effective to cause the liberation of hydrogen fluoride as a substantially dry vapor, blowing inert sweep gas selected from the group consisting of air, oxygen, nitrogen, argon, neon, helium, krypton, carbon dioxide, carbon monoxide, and hydrogen through said solution in said reactor in said second stage to facilitate the liberation of substantially all of the hydrogen fluoride from said solution, withdrawing said liberated hydrogen fluoride and sweep gas from said reactor in said second stage, and recovering said hydrogen fluoride by separating it from said sweep gas.

2. The process set forth in claim 1 in which the concentration of the concentrated sulfuric acid in the treated solution is controlled so as to be sufficiently high to assure a terminal concentration between about 65% $H_2SO_4$ and about 98% $H_2SO_4$ thereby effectively causing the rapid evolution of vapor.

3. The process set forth in claim 1 in which the fluosilicic acid containing solution is substantially devoid of free silica.

4. The process set forth in claim 1 in which a relatively large body of solution containing fluosilicic acid is maintained in the reactor and a stream of heated concentrated sulfuric acid is introduced into said body.

5. The process set forth in claim 1 in which the amount of sulfuric acid and the concentration thereof are controlled to obtain satisfactory dilution in the solution to provide suitably diluted sulfuric acid capable of being used in the acidulation process for the production of chemical products consisting of phosphoric acid and superphosphate and withdrawing the remaining diluted acid solution from the closed reactor containing said retained phosphatic values and utilizing said diluted sulfuric acid in the acidulation process for the production of chemical products consisting of phosphoric acid and superphosphate.

6. The process set forth in claim 1 in which the withdrawn silicon tetrafluoride vapor is absorbed in an aqueous solution and a reaction with water is effected to form fluosilicic acid and precipitated hydrated silica, and hydrated silica is removed from said solution to provide clear fluosilicic acid which can be recycled to the first operation for treatment with hot concentrated sulfuric acid.

References Cited by the Examiner

UNITED STATES PATENTS

| | | | |
|---|---|---|---|
| 465,607 | 12/1891 | Beylikgy | 23—153 |
| 1,297,464 | 3/1919 | Hechenbleikner | 23—153 |
| 1,367,993 | 2/1921 | Stahl | 23—153 X |
| 1,851,652 | 3/1932 | Soll et al. | 23—153 |
| 1,938,533 | 12/1933 | Penfield | 23—153 |
| 1,960,347 | 5/1934 | Osswald et al. | 23—153 |
| 2,686,151 | 8/1954 | Feldauer et al. | 23—153 X |
| 2,833,628 | 5/1958 | Molstad | 23—205 |
| 2,952,334 | 9/1960 | Provoost et al. | 23—153 X |
| 3,024,086 | 3/1962 | Cines | 23—153 |

MAURICE A. BRINDISI, *Primary Examiner.*

UNITED STATES PATENT OFFICE
CERTIFICATE OF CORRECTION

Patent No. 3,218,127 November 16, 1965

Theodore T. Houston

It is hereby certified that error appears in the above numbered patent requiring correction and that the said Letters Patent should read as corrected below.

Column 4, line 20, for "L-n" read -- L-h --; column 5, line 48, strike out "through heater", first occurrence; column 6, line 19, for "reator" read -- reactor --; line 71, for "producion" read -- production --.

Signed and sealed this 27th day of September 1966.

(SEAL)
Attest:

ERNEST W. SWIDER
Attesting Officer

EDWARD J. BRENNER
Commissioner of Patents